United States Patent [11] 3,566,750

| [72] | Inventor | Albert Allen |
| | | Sharon, Mass. |
| [21] | Appl. No. | 805,495 |
| [22] | Filed | Mar. 10, 1969 |
| [45] | Patented | Mar. 2, 1971 |
| [73] | Assignee | The Foxboro Company |
| | | Foxboro, Mass. |

[54] DIFFERENTIAL PRESSURE CELL WITH KEYSTONE STRUCTURE
1 Claim, 3 Drawing Figs.

[52] U.S. Cl. .................................................. 92/48, 92/97
[51] Int. Cl. ...................................................... F01b 19/02
[50] Field of Search ........................................... 92/97, 48, 103; 73/407

[56] References Cited
UNITED STATES PATENTS
| 1,421,381 | 7/1922 | Bawtree | 92/97X |
| 2,103,725 | 12/1937 | Jacobsson | 92/103X |
| 2,150,771 | 3/1939 | Kollsman | 92/48X |
| 2,770,258 | 11/1956 | Bowditch | 92/97 |
| 2,879,802 | 3/1959 | Du Bois | 73/410X |
| 3,319,468 | 5/1967 | Baumann | 73/407 |

FOREIGN PATENTS
| 523,674 | 9/1964 | Great Britain | 73/407 |
| 971,521 | 4/1956 | Canada | 92/97 |

Primary Examiner—Martin P. Schwadron
Assistant Examiner—Leslie J. Payne
Attorney—Lawrence H. Poeton ABSTRACT: A keystone structure to eliminate the need for diaphragm welding in a differential pressure capsule. Diaphragms are securely locked and sealed in place by bolts applying joining pressure to diaphragm periphery in a ring keystone structure. This structure provides a mechanical seal diaphragm mounting with tapered lock-in structure which prevents significant slippage during overrange.

INVENTOR.
ALBERT ALLEN

Patented March 2, 1971 3,566,750

INVENTOR.
ALBERT ALLEN

BY
Lawrence H. Poster

AGENT

DIFFERENTIAL PRESSURE CELL WITH KEYSTONE STRUCTURE

This invention relates to the measurement of differential pressure and in particular to differential pressure responsive diaphragm capsule assemblies adapted to be used in differential pressure measuring instruments and/or systems.

An illustration of such an assembly is set forth in U.S. Patent No. 2,770,258 to Bowditch. Measuring instruments of the type shown in the Bowditch patent comprise a casing having a diaphragm capsule mounted therein. This capsule divides the interior of the casing into two chambers which communicate respectively with the two pressures between which the difference is to be measured. The resultant force on the diaphragm capsule is transmitted by a force bar through flexure means in the casing wall and the transmitted signal may be measured externally of the casing by, for example, a pneumatic force balancing unit.

The diaphragm capsule of the Bowditch patent comprises a central backup plate, with a diaphragm secured to each side of the backup plate. An opening through the backup plate provides communication between the diaphragms, and the interior of the capsule is filled with uncompressible fluid.

As a means of providing hermetic sealing, the diaphragms are ring-welded to the backup plate. This welding is expensive and must be performed with precision and delicacy.

This invention provides a differential pressure structure wherein such full welding is unnecessary, and simple, inexpensive and precise diaphragm capsule construction and assembly is accomplished. This is an important step in the ever increasing need for lower cost instruments, provided without sacrifice of unit or system integrity.

An advantage of this invention is, therefore, a diaphragm capsule assembly accomplished by clamping in a keystone form which both provides effective sealing means and anchoring means against slippage under overrange conditions.

The clamping assembly of diaphragms according to this invention may be enhanced for particular applications by sonic-welding, often called cold-welding, wherein clamping pressure is supplemented by sonic vibrations which have the effect of sluffing off surface oxides of the joining interfaces to make possible a welding effect under simple pressure.

Further, the clamping keystone assembly of diaphragms according to this invention lends itself to effective overrange protection without the necessity of full ring welding Other objects and advantages of this invention will be in part apparent and in part pointed out hereinafter and in the accompanying drawings, wherein.

Figure 1:
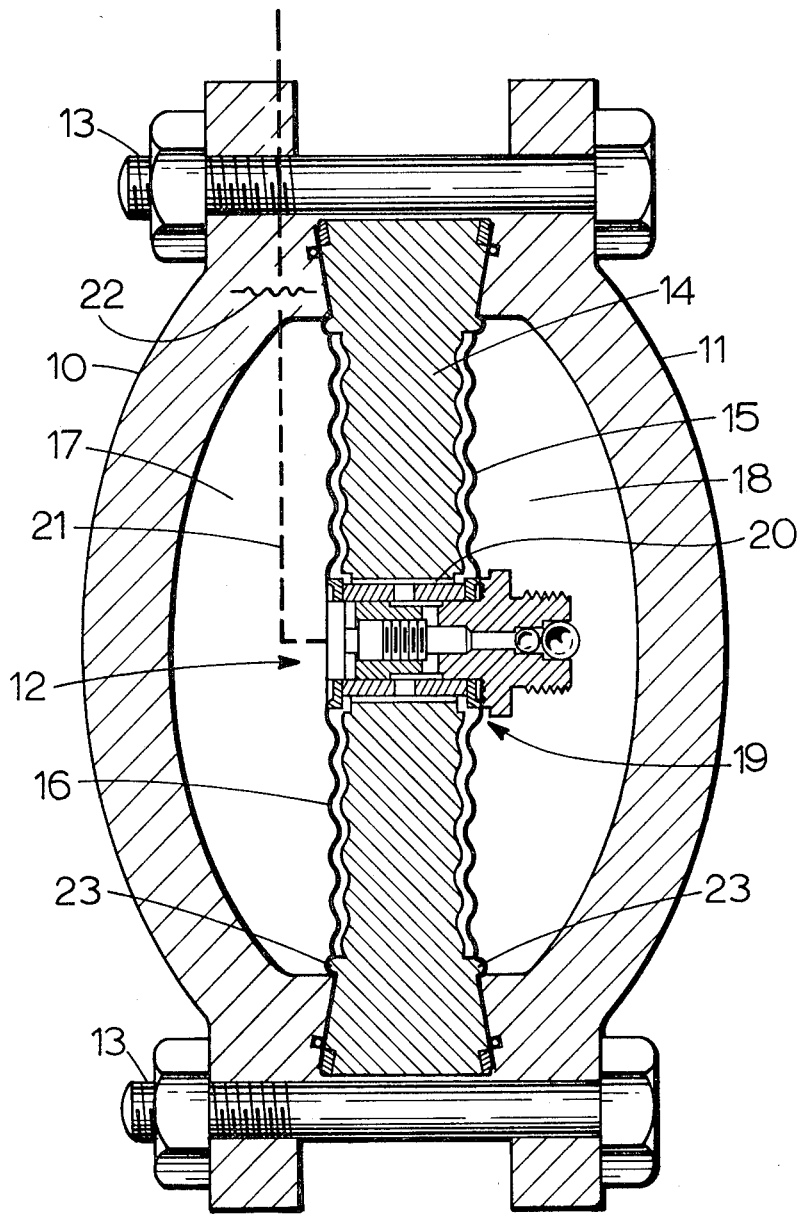
FIG. 1 is a central section of a differential pressure diaphragm capsule assembly according to this invention.

Referring more particularly to the drawings, the differential pressure capsule assembly of FIG. 1 comprises a housing of two parts 10 and 11, with a diaphragm assembly 12 clamped therebetween by bolts 13. The assembly 12 comprises in general a backup plate 14 having two corrugated resilient metal diaphragms 15 and 16 secured circularly at their peripheries to opposite sides of the backup plate.

The diaphragm assembly 12 divides the interior of the housing into two chambers 17 and 18, one of which communicates with each of the two pressures to be measured. Thus the external surface of diaphragm 15 is exposed to the pressure in chamber 18 and the external surface of diaphragm 16 is exposed to the pressure in chamber 17.

Figure 2:
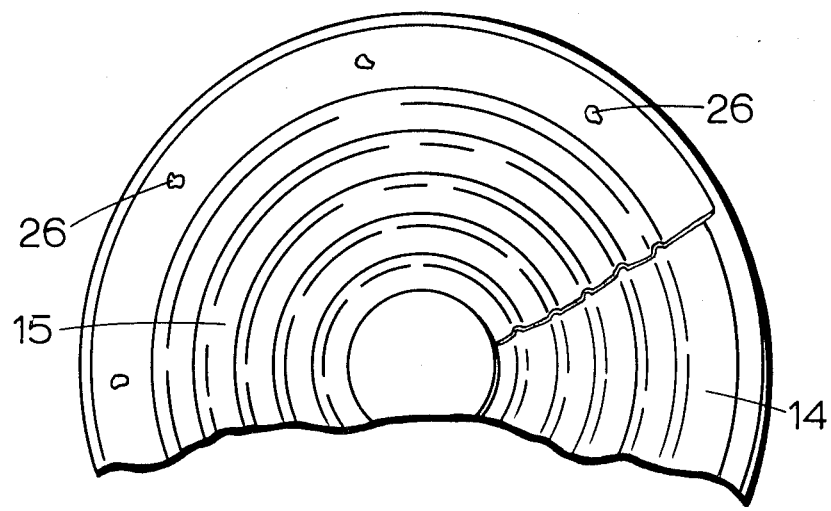
FIG. 2 is a fragmentary face view of a diaphragm as in FIG. 1, cut away to show the backup plate.

Referring to FIG. 2 as well as to FIG. 1, the two diaphragms 15 and 16 are of generally circular configuration with circular corrugations and are interconnected by a member 19 which extends freely through a central opening 20 in the backup plate 14. Thus, when a pressure difference is established between the chambers 17 and 18, the diaphragms 15 and 16 and the connection 19 tend to move toward the lower pressure chamber. Movement of the diaphragm is opposed by a force bar indicated at 21 which is mounted in a flexible diaphragm 22 forming a part of the wall of the housing part 10. Thus differential pressure may be converted into an output signal with only a very small movement of the diaphragms 15 and 16.

Figure 3:
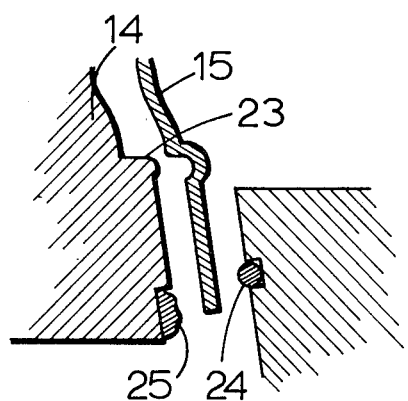
FIG. 3 is an enlargement in fragment of FIG. 1, illustrating the keystone clamp form and overrange annular boss according to this invention.

As in FIGS. 1 and 3 the backup plate 14 has surface convolutions to match those of the diaphragms 15 and 16 so that overrange pressures will seat the diaphragm on the backup plate without harm.

The backup plate 14 is provided with a peripheral ridges or bosses 23, FIG. 3, over which a peripheral portions of the diaphragms are formed. The diaphragms are locked on these bosses by their clamping assembly, but are not secured thereto as in the structure of the Bowditch patent. The diaphragms are thus supported, in balanced pressure situations, in spaced relation with all of the main area of the backup plate, the bosses 23 providing a flexure bending takeoff point for movement of the diaphragms. Accordingly there is provided a volume between the diaphragms and through the backup plate which is liquid filled according to the needs and uses of this type of double diaphragm differential pressure device.

The structure of this invention utilizes a keystone form to provide a simple clamping arrangement that is precise and inexpensive and eliminates errors of ordinary clamped structures, that is, errors that are introduced when the diaphragm is rigidly clamped at its functioning periphery. In this invention, as shown in FIGS. 1 and 3, the functioning periphery of the diaphragm is at the support provided by the boss 23. This is the 'takeoff' or flexure area of the diaphragm provided in this invention without rigid support. The keystone clamp area is radially outward of this takeoff area which is in fact essentially a circular line.

The keystone clamp is provided by a keystone peripheral form in the backup plate 14, combined with matching forms on the housing parts 10 and 11, with the peripheral areas of the diaphragms 15 and 16 clamped therebetween. As in FIG. 3, O-ring seals may be provided at 24 and 25 to aid in providing the necessary hermetic seal for the capsule pressure chambers.

If desired, the diaphragms may be tack-welded around the periphery as at 26, FIG. 2, as an assembly aid, or they may simply be mounted on the bosses 23, and then pressure clamped by the bolts 13. Any suitable number of such bolts may be used around the periphery of the housing.

As the bolts are tightened, the cam tendency of the keystone faces with respect to each other, with the diaphragm periphery therebetween, tends to squeeze the diaphragm in an inclined plane tightening action which increases the effectiveness of the seal. As previously indicated, cold-welding effects may be achieved.

This invention, therefore, provides a new and useful differential pressure capsule structure, in which the need for full welding has been eliminated, and in which diaphragms are simply and securely mounted and sealed through the use of a bolted keystone structure, providing a mechanical seal and a tapered lock-in structure which prevents significant slipping during overrange.

As many embodiments may be made of the above invention and as changes may be made in the embodiment set forth above without departing from the scope of the invention, it is to be understood that all matter hereinbefore set forth and in the accompanying drawings is to be interpreted as illustrative only and not in a limiting sense.

I claim:

1. A differential pressure responsive apparatus in which:
   an assembly of two diaphragms oppositely mounted on a pressure backup plate is peripherally clamped with the diaphragms held between two parts of a housing and the backup plates to define two pressure chambers, wherein the clamping force holding the diaphragms and the backup plate is increased when overrange pressure occurs in such chambers, by a keystone peripheral form of the backup plate in a like keystone form provided by such two housing parts together, whereby such increased pressure tends to draw the periphery of the diaphragm assembly radially inward in an action tending to increase the clamping force on the diaphragms between the backup plate and the two housing parts;

said differential pressure responsive apparatus comprising a two-part casing, a diaphragm assembly as a divider between said parts of said casing whereby said casing is provided with two chambers, one on each side of said diaphragm assembly, and means for clamping said casing parts together against said diaphragm and backup plate assembly in securement of said assembly therebetween;

said two parts of said casing each having an internal annular cutout form, said forms facing each other to provide an annular recess having in cross section the shape of a truncated triangle keystone with the larger base of said triangle forming the outer periphery of said annular cutout form;

said diaphragm assembly comprising a central backing plate and two diaphragms, one of said diaphragms on each side of said backing plate;

said central backing plate having an annular peripheral form in essential duplication of said annular casing recess truncated triangle form, and located in pressure overrange protective locking keystone relation within said annular casing recess, said locking relation being maintained by said clamping means in holding said casing parts against said diaphragms and said diaphragms in turn against said backing plate with said locking relation increased in force by overrange pressures in said chambers tending to draw said backing plate radially inward;

said backup plate being formed of rigid metal and said diaphragms being formed of resilient metal and secured at their peripheries between said casing parts and the opposite sides of said plate, within said annular recess of said casing, to form a hermetically sealed unit, said backup plate having a passage therethrough establishing internal communication between said diaphragms;

a peripheral boss standing out from each side of said backing plate adjacent the shorter base of said truncated triangle form; and each of said diaphragms being peripherally held in said keystone form between one of said casing parts and said backing plate, said diaphragms each being form-fitted over said backing plate bosses to provide annular boss-forms in said diaphragms and to provide means for holding said diaphragms away from said backing plate in the area radially within said backing plate bosses, under balance pressure conditions in said casing chambers.